United States Patent
Kanamarlapudi et al.

(10) Patent No.: US 12,495,327 B2
(45) Date of Patent: Dec. 9, 2025

(54) BUFFER THRESHOLD FOR SECONDARY CELL GROUP ACTIVATION

(71) Applicant: QUALCOMM Incorporated, San Diego, CA (US)

(72) Inventors: Sitaramanjaneyulu Kanamarlapudi, San Diego, CA (US); Ozcan Ozturk, San Diego, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 18/050,180

(22) Filed: Oct. 27, 2022

(65) Prior Publication Data

US 2023/0239731 A1    Jul. 27, 2023

Related U.S. Application Data

(60) Provisional application No. 63/266,993, filed on Jan. 21, 2022.

(51) Int. Cl.
*H04W 28/02* (2009.01)
*H04L 5/00* (2006.01)
*H04W 28/082* (2023.01)

(52) U.S. Cl.
CPC ....... *H04W 28/0278* (2013.01); *H04L 5/0098* (2013.01); *H04W 28/082* (2023.05)

(58) Field of Classification Search
CPC ........... H04W 28/0278; H04W 28/082; H04W 28/0942; H04L 5/0098
See application file for complete search history.

(56) References Cited

U.S. PATENT DOCUMENTS

| 2021/0051767 A1 | 2/2021 | Zhang et al. | |
| 2022/0225453 A1* | 7/2022 | Kim | H04W 76/20 |
| 2023/0413356 A1* | 12/2023 | Wu | H04W 76/27 |

FOREIGN PATENT DOCUMENTS

| CN | 102355336 A * | 2/2012 | H04L 1/1685 |
| CN | 111182584 A * | 5/2020 | H04W 28/0278 |
| WO | 2021067236 A1 | 4/2021 | |
| WO | WO-2022236589 A1 * | 11/2022 | H04W 76/12 |

OTHER PUBLICATIONS

International Search Report and Written Opinion—PCT/US2022/080489—ISA/EPO—Feb. 24, 2023.
VIVO: "Activation of a Deactivated SCG", 3GPP TSG-RAN WG2 Meeting #116, R2-2110506, 3rd Generation Partnership Project, Mobile Competence Centre, 650, Route Des Lucioles, F-06921 Sophia-Antipolis Cedex, France, vol. RAN WG2, No. E-Meeting, Nov. 1, 2021-Nov. 12, 2021, Oct. 22, 2021, 15 Pages, XP052066953, pp. 7, 14, 15.

* cited by examiner

*Primary Examiner* — Khoa Huynh
(74) *Attorney, Agent, or Firm* — Harrity & Harrity, LLP

(57) ABSTRACT

Various aspects of the present disclosure generally relate to wireless communication. In some aspects, a user equipment (UE) may generate a buffer status report (BSR) in response to a data radio bearer (DRB) for a secondary cell group (SCG) being a split DRB, the SCG being deactivated, and a buffer size satisfying a threshold for transmitting the BSR to activate the SCG. The UE may transmit the BSR. The UE may communicate on the SCG after activation of the SCG. Numerous other aspects are described.

22 Claims, 9 Drawing Sheets

BUFFER THRESHOLD FOR SECONDARY CELL GROUP ACTIVATION

CROSS-REFERENCE TO RELATED APPLICATION

This Patent Application claims priority to U.S. Provisional Patent Application No. 63/266,993, filed on Jan. 21, 2022, entitled "BUFFER THRESHOLD FOR SECONDARY CELL GROUP ACTIVATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for using a buffer status for activating a secondary cell group.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include generating a buffer status report (BSR) in response to a data radio bearer (DRB) for a secondary cell group (SCG) being a split DRB, the SCG being deactivated, and a buffer size satisfying a threshold for transmitting the BSR to activate the SCG. The method may include transmitting the BSR. The method may include communicating on the SCG after activation of the SCG.

Some aspects described herein relate to a method of wireless communication performed by a network node. The method may include receiving a buffer status report (BSR) for a split DRB for an SCG that is deactivated. The method may include activating the SCG based at least in part on the BSR. The method may include communicating on the SCG upon activation of the SCG.

Some aspects described herein relate to a UE for wireless communication. The UE may include a memory and one or more processors coupled to the memory. The one or more processors may be configured to generate a BSR in response to a DRB for an SCG being a split DRB, the SCG being deactivated, and a buffer size satisfying a threshold for transmitting the BSR to activate the SCG. The one or more processors may be configured to transmit the BSR. The one or more processors may be configured to communicate on the SCG after activation of the SCG.

Some aspects described herein relate to a network node for wireless communication. The network node may include a memory and one or more processors coupled to the memory. The one or more processors may be configured to receive a BSR for a split DRB for an SCG that is deactivated. The one or more processors may be configured to activate the SCG based at least in part on the BSR. The one or more processors may be configured to communicate on the SCG upon activation of the SCG.

Some aspects described herein relate to a non-transitory computer-readable medium that stores a set of instructions for wireless communication by a UE. The set of instructions, when executed by one or more processors of the UE, may cause the UE to generate a BSR in response to a DRB for an SCG being a split DRB, the SCG being deactivated, and a buffer size satisfying a threshold for transmitting the BSR to activate the SCG. The set of instructions, when executed by one or more processors of the UE, may cause the UE to transmit the BSR. The set of instructions, when executed by one or more processors of the UE, may cause the UE to communicate on the SCG after activation of the SCG.

Some aspects described herein relate to a non-transitory computer-readable medium that stores a set of instructions for wireless communication by a network node. The set of instructions, when executed by one or more processors of the network node, may cause the network node to receive a BSR for a split DRB for an SCG that is deactivated. The set of instructions, when executed by one or more processors of the network node, may cause the network node to activate the SCG based at least in part on the BSR. The set of instructions, when executed by one or more processors of the network node, may cause the network node to communicate on the SCG upon activation of the SCG.

Some aspects described herein relate to an apparatus for wireless communication. The apparatus may include means for generating a BSR in response to a DRB for an SCG being a split DRB, the SCG being deactivated, and a buffer size satisfying a threshold for transmitting the BSR to activate the SCG. The apparatus may include means for transmitting the BSR. The apparatus may include means for communicating on the SCG after activation of the SCG.

Some aspects described herein relate to an apparatus for wireless communication. The apparatus may include means for receiving a BSR for a split DRB for an SCG that is deactivated. The apparatus may include means for activating the SCG based at least in part on the BSR. The apparatus may include means for communicating on the SCG upon activation of the SCG.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
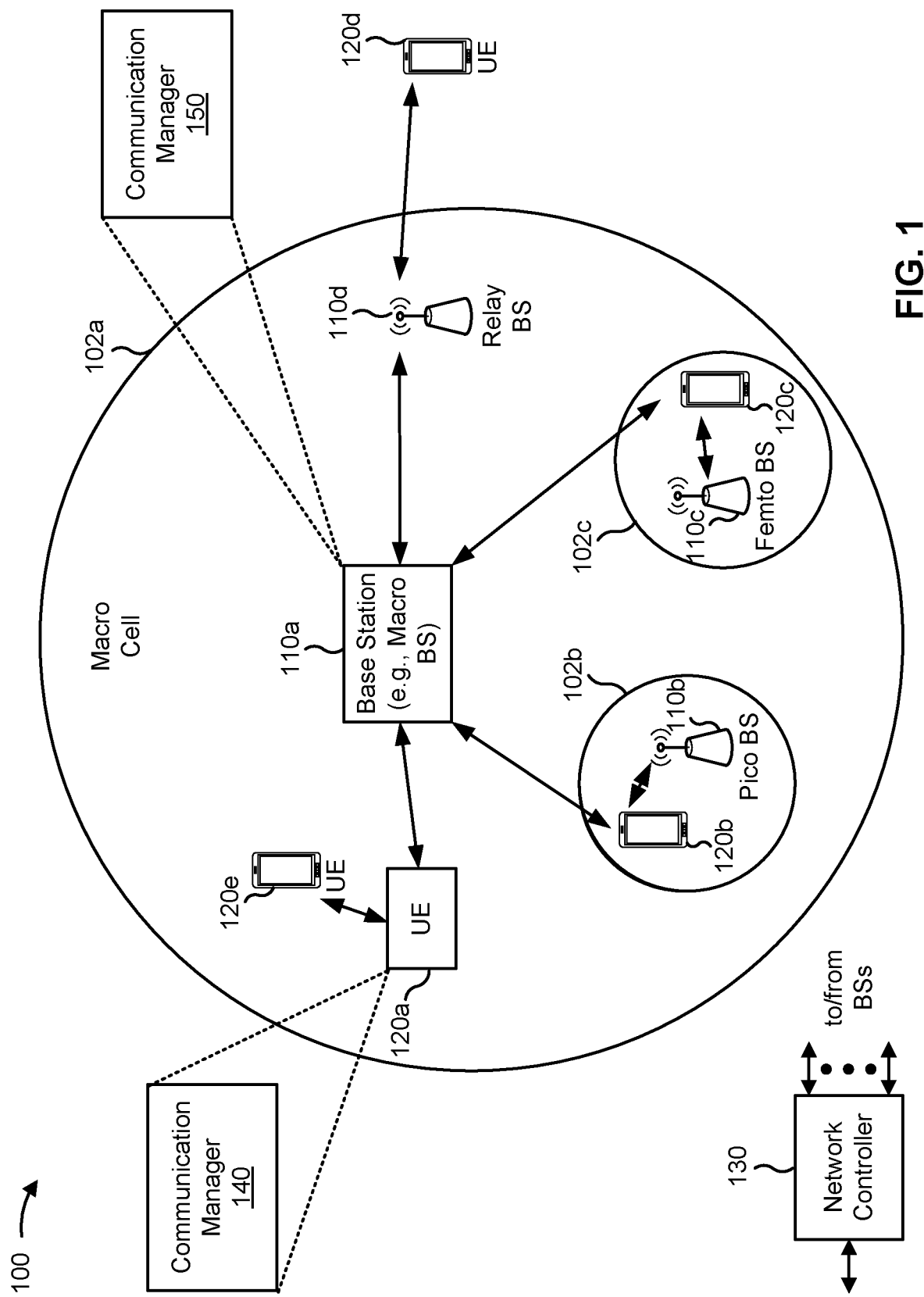
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the term "base station" (e.g., the base station 110) may refer to an aggregated base station, a disaggregated base station, and/or one or more components of a disaggregated base station. For example, in some aspects, "base station" may refer to a central unit, a distributed unit, and/or a combination thereof. In some aspects, "base station" may refer to one device configured to perform one or more functions such as those described above in connection with the base station 110. In some aspects, "base station" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" may refer to any one or more of those different devices. In some aspects, "base station" may refer to one or more virtual base stations, one or more virtual base station functions, and/or a combination of thereof. For example, in some cases, two or more base station functions may be instantiated on a single device. In some aspects, "base station" may refer to one of the base station functions and not another. In this way, a single device may include more than one base station. An aggregated base station or a disaggregated base station may also be referred to a "network node".

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band. Some frequency bands may include terahertz (THz) or sub-THz bands.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may generate a buffer status report (BSR) in response to a data radio bearer (DRB) for a secondary cell group (SCG) being a split DRB, the SCG being deactivated, and a buffer size satisfying a threshold for transmitting the BSR to activate the SCG; transmit the BSR; and communicate on the SCG after activation of the SCG. Additionally, or alternatively, the communication manager 140 may perform one or more other operations described herein.

In some aspects, a network node (e.g., base station 110) may include a communication manager 150. As described in more detail elsewhere herein, the communication manager 150 may receive a BSR for a split DRB for an SCG that is deactivated; activate the SCG; and communicate on the SCG upon activation of the SCG. Additionally, or alternatively, the communication manager 150 may perform one or more other operations described herein.

As indicated above, FIG. 1 is provided as an example. Other examples may differ from what is described with regard to FIG. 1.

Figure 2:
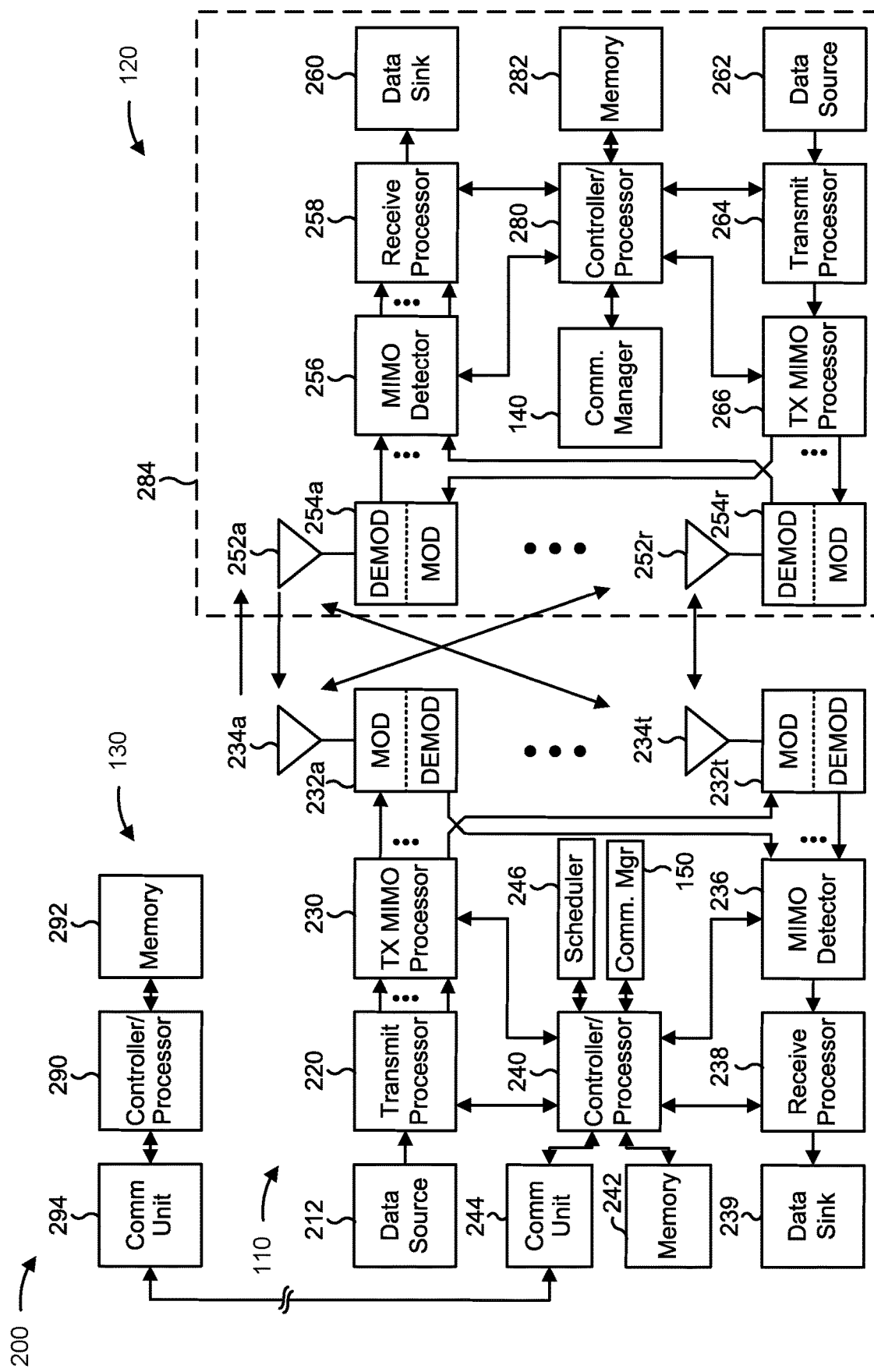
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor of a network node (e.g., controller/processor 240 of the base station 110), the controller/processor 280 of the UE 120, and/or any other component(s) of FIG. 2 may perform one or more techniques associated with using a BSR threshold for activating an SCG, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for generating a BSR in response to a DRB for an SCG being a split DRB, the SCG being deactivated, and a buffer size satisfying a threshold for transmitting the BSR to activate the SCG; means for transmitting the BSR; and/or means for communicating on the SCG after activation of the SCG. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., base station 110) includes means for receiving a BSR for a split DRB for an SCG that is deactivated; means for activating the SCG; and/or means for communicating on the SCG upon activation of the SCG. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
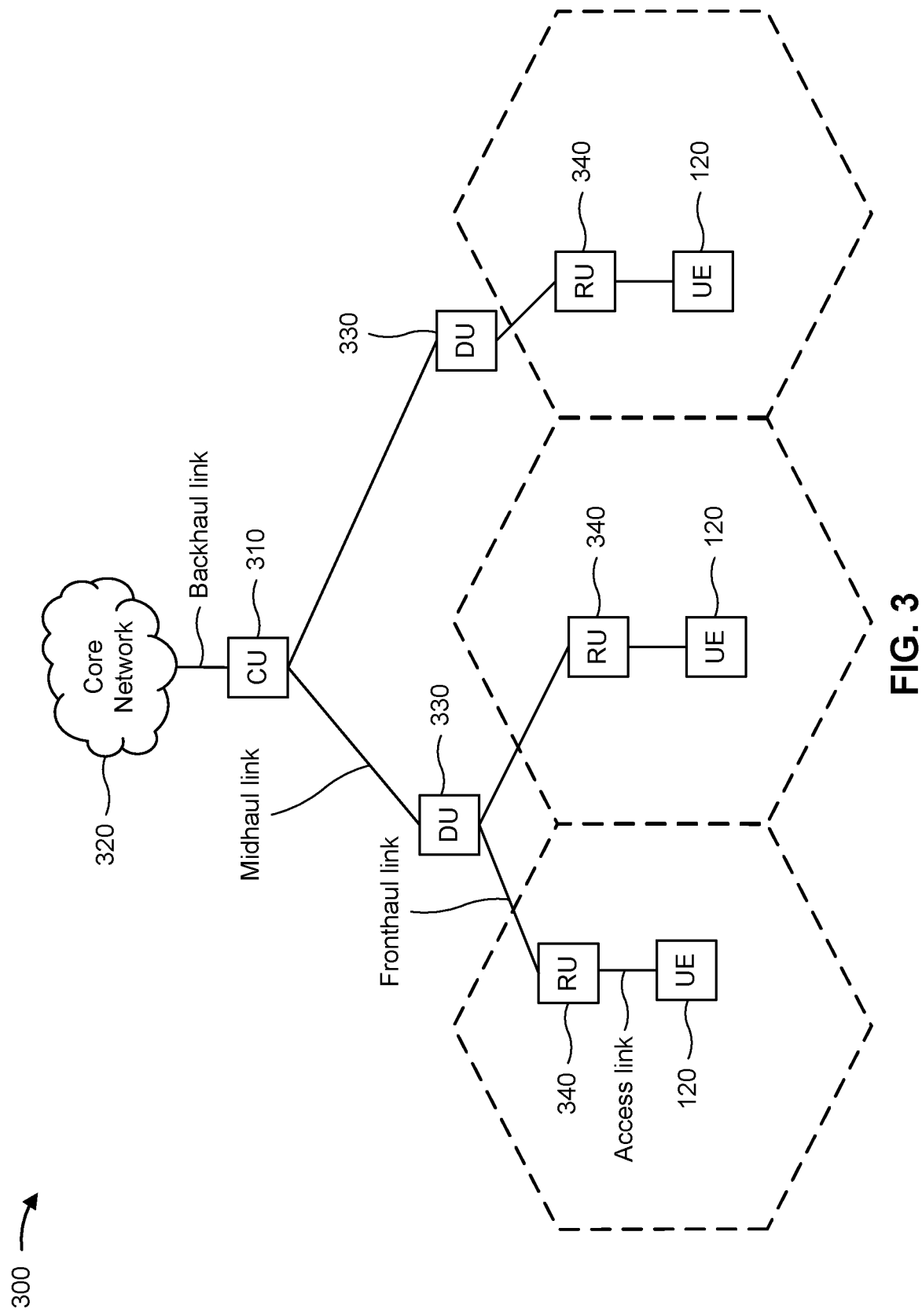
FIG. 3 is a diagram illustrating an example of an open radio access network architecture, in accordance with the present disclosure.

FIG. 3 is a diagram illustrating an example 300 of an open RAN (O-RAN) architecture, in accordance with the present disclosure. As shown in FIG. 3, the O-RAN architecture may include components of a network node, such as a disaggregated base station (e.g., base station 110). The components may include a central unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively. A network node may include a CU, a DU, an RU, or any combination of CUs, DUs, and RUs. The fronthaul link, the midhaul link, and the backhaul link may be generally referred to as "communication links."

In some aspects, the DUs 330 and the RUs 340 may be implemented according to a functional split architecture in which functionality of a network node (e.g., base station 110, an eNB, a gNB) is provided by a DU 330 and one or more RUs 340 that communicate over a fronthaul link. Accordingly, as described herein, a network node may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
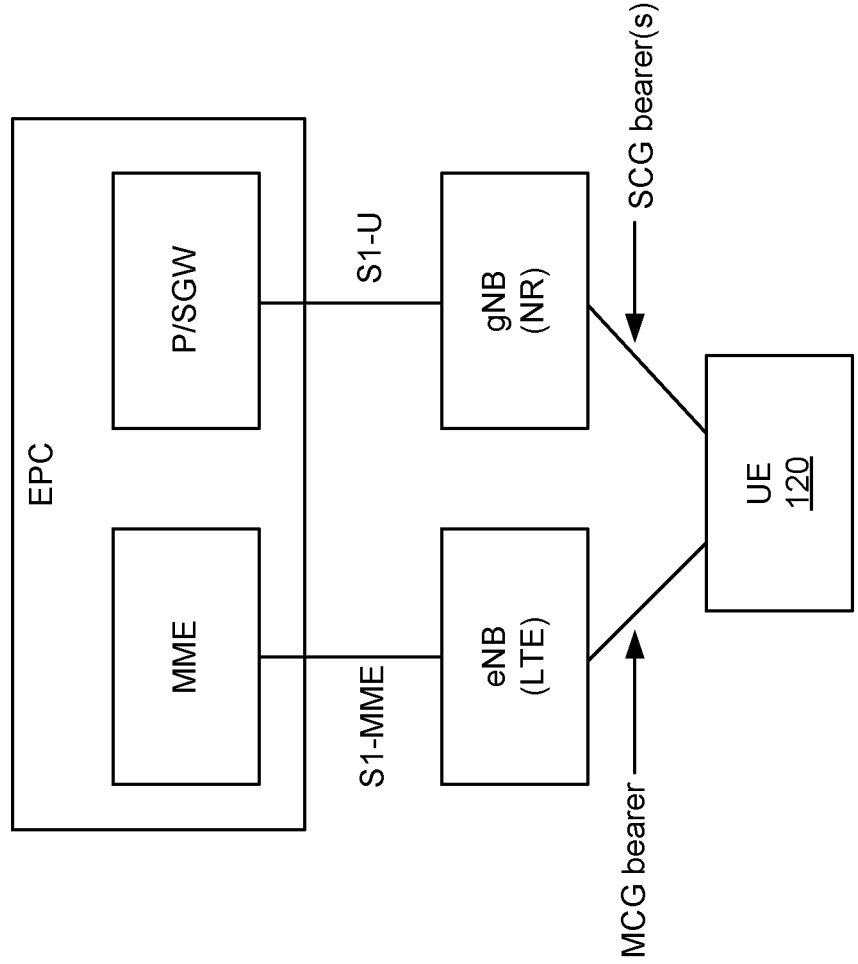
FIG. 4 is a diagram illustrating an example of dual connectivity, in accordance with the present disclosure.

FIG. 4 is a diagram illustrating an example 400 of dual connectivity, in accordance with the present disclosure. The example shown in FIG. 4 is for an Evolved Universal Mobile Telecommunications System Terrestrial Radio Access (E-UTRA)-NR dual connectivity (ENDC) mode. In the ENDC mode, a UE 120 communicates using an LTE radio access technology (RAT) on a master cell group (MCG), and the UE 120 communicates using an NR RAT on an SCG. However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode.

As shown in FIG. 4, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 4, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 4, in some aspects, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). A bearer is a communication tunnel that is used to connect network entities (e.g., network node, gateway, UE 120) and carry communications between the network entities. For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB. A split bearer may split communications into two paths for different RATs or different cell groups. For example, a split bearer may carry communications for both an MCG and an SCG. A packet data convergence protocol (PDCP) may be used to manage a DRB, and the DRB may be referred to as a "PDCP DRB".

Whenever there is new data on an SCG DRB waiting for transmission, the UE 120 may indicate via the MCG that the UE 120 has uplink data to transmit for SCG DRBs. The SCG may be deactivated. The UE 120 may transmit a BSR to activate the SCG. A BSR may be used to provide a network node (e.g., base station 110) with information about an amount of uplink data that is waiting to be transmitted in a medium access control (MAC) entity at the UE 120. A radio resource control (RRC) configuration may include parameters to control the BSR. The parameters may include a periodic BSR timer (e.g., periodicBSR-Timer), a retransmission BSR timer (e.g., retxBSR-Timer), and logical channel parameters (e.g., logicalChannelSR-DelayTimerApplied, logicalChannelSR-DelayTimer, logicalChannelSR-Mask, logicalChannelGroup). Each logical channel may be allocated to a logical channel group (LCG), and the maximum number of LCGs may be eight. The MAC entity may determine the amount of uplink data that is available for a logical channel. A BSR (e.g., Regular BSR) may be triggered upon two conditions. A first condition is if uplink data for a logical channel of an LCG becomes available and the logical channel has a higher priority than any logical channel containing available uplink data (new data has a higher priority than current data). A second condition is if none of the logical channels contains any available uplink data (going from zero buffer size to non-zero buffer size). The buffer size may be the amount of uplink data in the buffer at the MAC entity (e.g., the UE 120) that is ready to be transmitted.

However, when new data arrives on an SCG deactivated split bearer, the BSR goes to the MCG and it is up to the MCG to decide whether to activate the SCG. Since there is a retransmission BSR timer (e.g., retx-BSRtimer), once the BSR is transmitted, unless other triggering conditions are met (e.g., the first condition and the second condition), the BSR is not transmitted again. If the BSR is transmitted when the buffer size is, for example, 20 kilobytes (KB), even though the buffer size may increase to 500 KB, the next BSR is not transmitted if the same bearer received the uplink data and the retransmission BSR timer is running. If the buffer size is getting rather large, there is not a timely and efficient way to induce transmission of a BSR to activate the SCG and transmit the uplink data using the SCG.

Furthermore, a bearer configured as a split bearer may use a data split threshold (e.g., ul-DataSplitThreshold) for an associated PDCP bearer in consideration of latency and throughput. If the data split threshold is exceeded, the UE 120 may transmit an RRC message (e.g., RRC UE assistance information (UAI) message) via the MCG to activate the SCG. The data split threshold may vary based on network deployment choices and associated network topologies. For example, in some markets, the split threshold may be 0 KB (US), 100 KB (Korea), or a very large value (Japan). These choices may be based on a load on the SCG as well as the different legs and related delays between using an SCG split and using MCG alone. However, use of an RRC message via the MCG involves additional latency and additional overhead (signaling resources).

As indicated above, FIG. 4 is provided as an example. Other examples may differ from what is described with respect to FIG. 4.

Figure 5:
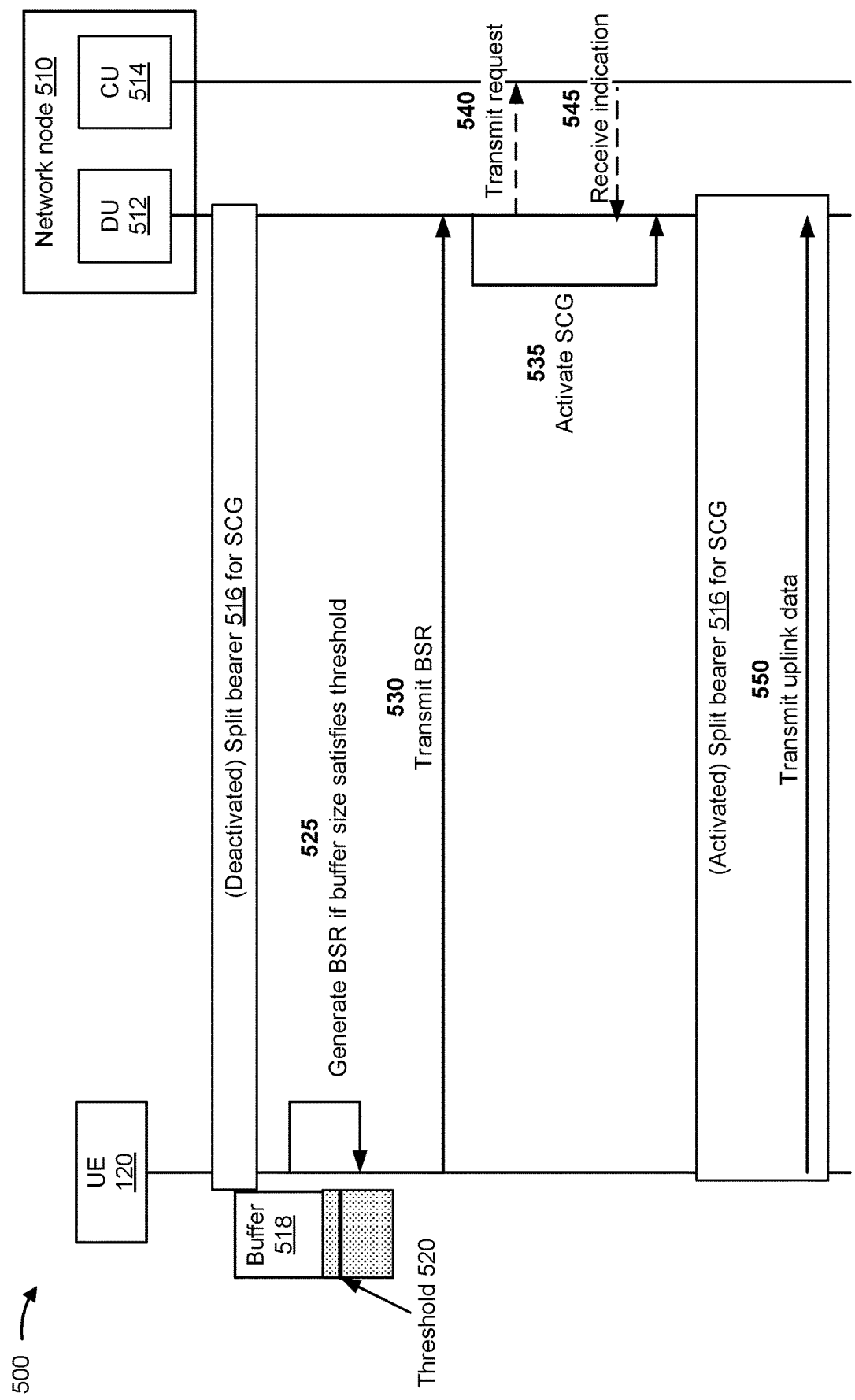
FIG. 5 is a diagram illustrating an example associated with using a buffer status report to activate a secondary cell group, in accordance with the present disclosure.

FIG. 5 is a diagram illustrating an example 500 associated with using a BSR to activate an SCG, in accordance with the present disclosure. As shown in FIG. 5, a network node 510 (e.g., a base station 110) may include a DU 512 and a CU 514. The network node 510 and a UE 120 may communicate with one another over a split bearer 516 for an SCG. UE 120 may accumulate uplink data for transmission in a buffer 518. The amount of uplink data in the buffer 518 awaiting transmission using the SCG may be a buffer size.

According to various aspects described herein, the UE 120 (MAC entity) may use a third condition for triggering a BSR that can be used to activate the SCG. The third condition may include transmitting the BSR if the buffer size of the buffer 518 satisfies (e.g., meets or exceeds) a threshold 520 (e.g., an SCG activation threshold). The threshold 520 may be, for example, a minimum buffer size. The UE 120 may transmit the BSR once the threshold 520 is reached and without waiting for a BSR timer to expire. For example, if the buffer size crosses the threshold 520 within 50 milliseconds (ms), the UE 120 may transmit the BSR without waiting for a retransmission BSR timer (which may be greater than 300 ms) to expire. As a result, the UE 120 may reduce latency in transmissions.

The network node 510 may determine to activate the SCG based at least in part on the BSR. In this way, the SCG is activated sooner, and uplink data is transmitted before the buffer size and latency grow too large. This new third condition also avoids additional SRB traffic and RRC signaling overhead, because the BSR can be transmitted without using an RRC message or developing a whole new RRC procedure.

As shown by reference number 525, the UE 120 may generate a BSR in response to the split bearer 516 for the SCG being deactivated and the buffer size satisfying a threshold 520 for transmitting the BSR to activate the SCG. In some aspects, the UE 120 may set a value of the threshold 520 to be different than a value of a data split threshold for an associated packet data convergence protocol (PDCP) bearer. For example, the value may be greater than the data split threshold. If the threshold 520 is not explicitly configured at the UE 120, the UE 120 may set the value of the threshold 520 to match the value of the data split threshold.

The UE 120 may receive the value for the threshold 520 from the network node 510. The network node 510 may have flexibility to configure different threshold values at the MAC level (as compared to the PDCP data split threshold) based on network scheduling and configuration flexibility. For example, some networks may select 0 KB for the data split threshold, and some networks may select 100 KB or 500 KB based on the associated latency between paths as well as scheduling resource availability. Networks may activate the SCG only with a 500 KB minimum, while ready to split data across legs with 100 KB each. The selection may be based on the time required to activate the SCG activation as compared to resource availability in an already activated SCG.

As shown by reference number 530, the UE 120 may transmit the BSR. The BSR may transmit the BSR independently of whether a periodic BSR timer is running or a retransmission BSR timer is running. The UE 120 may restart the retransmission BSR timer in response to transmitting the BSR.

The network node 510 may receive the BSR and determine to activate the SCG based at least in part on the BSR, as shown by reference number 535. The DU 512 of the network node 510 may determine autonomously (without direction or instruction from the CU 514) to activate the SCG. Alternatively, as shown by reference number 540, the DU 512 may transmit a request to activate the SCG to the CU 514, and as shown by reference number 545, the DU 512 may receive an indication to activate the SCG.

In some aspects, the network node 510 may activate the SCG based at least in part on SRB traffic that is initiated with the BSR. This may involve triggering the first condition, where the SCG is activated based at least in part on a priority of the SRB traffic.

In some aspects, the network node 510 may activate the SCG based at least in part on a threshold for activating the SCG. The threshold may be based at least in part on locations of network nodes, an associated latency between the network nodes, and/or a load (e.g., traffic load) across the network nodes and interconnects between the network nodes. For example, the threshold may be a minimum latency, a minimum load, a minimum distance, or a combination thereof.

The network node 510 may involve a disaggregated base station. If the DUs are not co-located, the threshold may be relaxed (e.g., lowered, raised) because of the latency and a loading factor. If the DUs are co-located, the threshold may be more aggressive (e.g., higher, lower) for activation or deactivation than compared to when the DUs are not co-located. If one entity is in the cloud (e.g., CU), interaction takes more time and thus the threshold may be more relaxed.

In some aspects, the CU and/or a DU may be in a terrestrial network entity and/or in a non-terrestrial network (NTN) entity. The NTN entity may be a high altitude platform station (HAPS), an unmanned aerial vehicle (UAV), a drone, a satellite, or any other device communicating from the air. If an NTN is involved, the threshold and activation of the SCG may have different parameters for latency, loading, and/or coverage.

As shown by reference number 550, the UE 120 may transmit the uplink data in the buffer 518 using the activated SCG on the split bearer 516. While various aspects are described for the split bearer 516, some aspects may involve a non-split bearer.

As indicated above, FIG. 5 is provided as an example. Other examples may differ from what is described with respect to FIG. 5.

Figure 6:
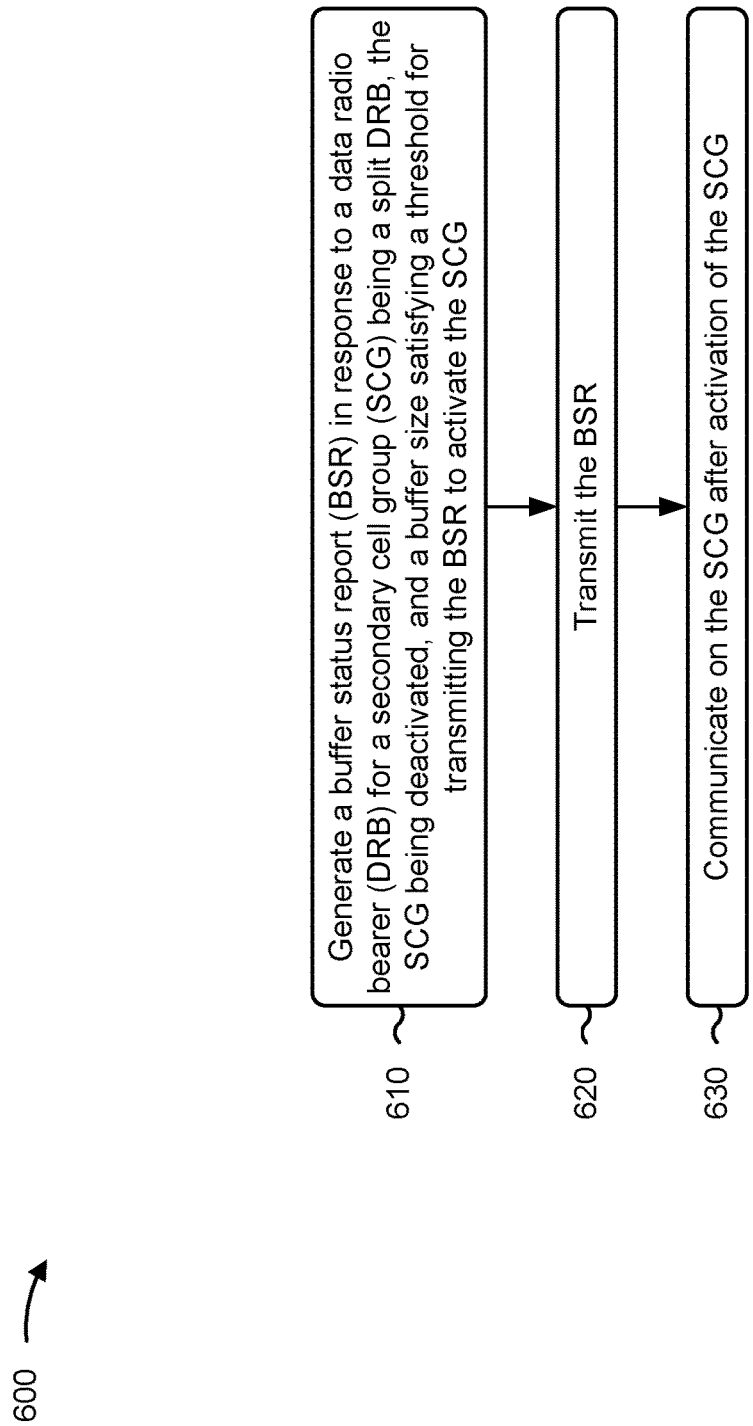
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with using a buffer threshold to activate an SCG with a BSR.

As shown in FIG. 6, in some aspects, process 600 may include generating a BSR in response to a DRB for an SCG being a split DRB, the SCG being deactivated, and a buffer size satisfying a threshold for transmitting the BSR to activate the SCG (block 610). For example, the UE (e.g., using communication manager 140 and/or generation component 808 depicted in FIG. 8) may generate a BSR in response to a DRB for an SCG being a split DRB, the SCG being deactivated, and a buffer size satisfying a threshold for transmitting the BSR to activate the SCG, as described above.

As further shown in FIG. 6, in some aspects, process 600 may include transmitting the BSR (block 620). For example, the UE (e.g., using communication manager 140 and/or transmission component 804 depicted in FIG. 8) may transmit the BSR, as described above.

As further shown in FIG. 6, in some aspects, process 600 may include communicating on the SCG after activation of the SCG (block 630). For example, the UE (e.g., using communication manager 140, transmission component 804, and/or reception component 802 depicted in FIG. 8) may communicate on the SCG after activation of the SCG, as described above.

Process 600 may include additional aspects, such as any single aspect or any combination of aspects described below and/or in connection with one or more other processes described elsewhere herein.

In a first aspect, transmitting the BSR includes transmitting the BSR independently of whether a periodic BSR timer is running or a retransmission BSR timer is running.

In a second aspect, alone or in combination with the first aspect, process 600 includes restarting a retransmission BSR timer in response to transmitting the BSR.

In a third aspect, alone or in combination with one or more of the first and second aspects, process 600 includes setting a value of the threshold to be different than a value of a data split threshold for an associated PDCP bearer.

In a fourth aspect, alone or in combination with one or more of the first through third aspects, process 600 includes setting a value of the threshold based at least in part on a received value for the threshold.

In a fifth aspect, alone or in combination with one or more of the first through fourth aspects, process 600 includes setting a value of the threshold to match a value of a data split threshold for an associated PDCP bearer, if the value of the threshold is not configured.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
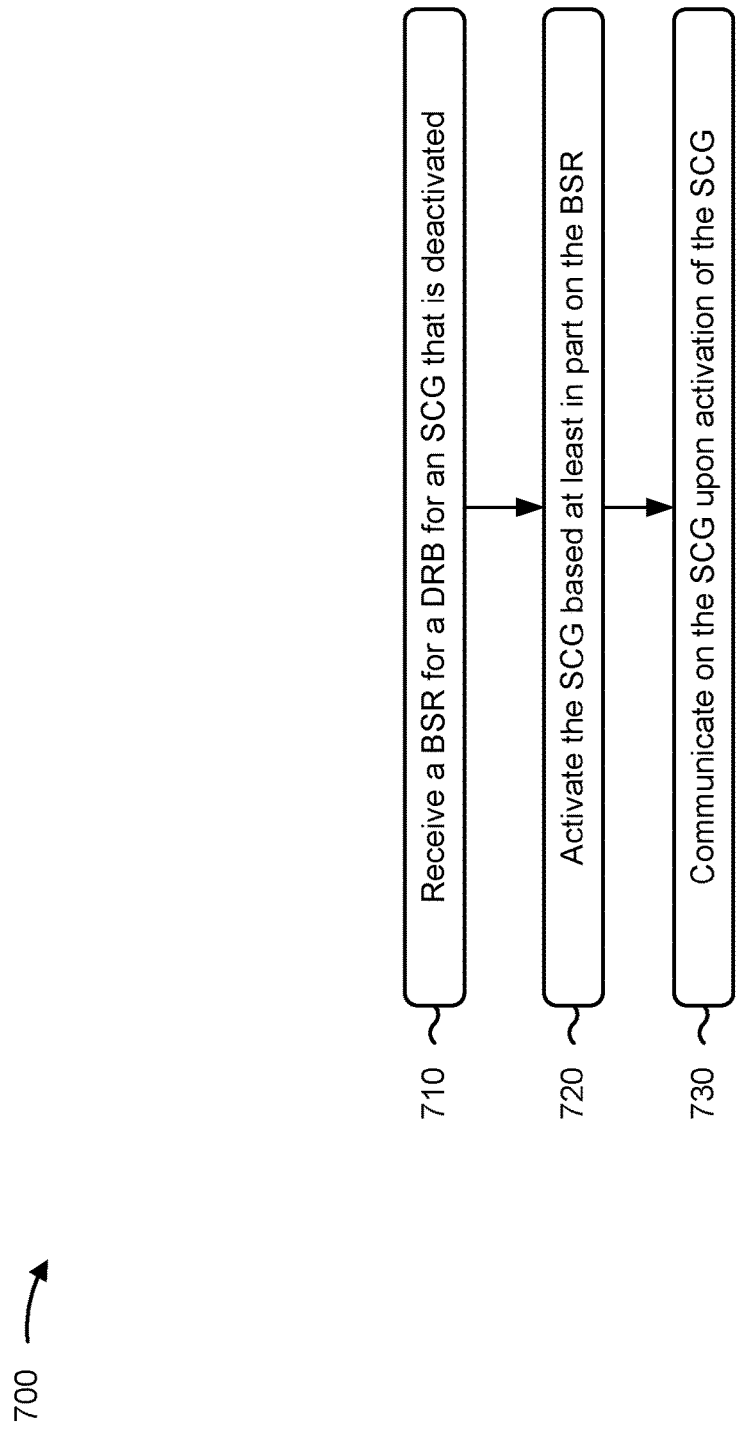
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 510) performs operations associated with activating an SCG with a BSR.

As shown in FIG. 7, in some aspects, process 700 may include receiving a BSR for a split DRB for an SCG that is deactivated (block 710). For example, the network node (e.g., using communication manager 150 and/or reception component 902 depicted in FIG. 9) may receive a BSR for a split DRB for an SCG that is deactivated, as described above.

As further shown in FIG. 7, in some aspects, process 700 may include activating the SCG based at least in part on the BSR (block 720). For example, the network node (e.g., using communication manager 150 and/or activation component 908 depicted in FIG. 9) may activate the SCG based at least in part on the BSR, as described above.

As further shown in FIG. 7, in some aspects, process 700 may include communicating on the SCG upon activation of the SCG (block 730). For example, the network node (e.g., using communication manager 150, transmission component 904, and/or reception component 902 depicted in FIG. 9) may communicate on the SCG upon activation of the SCG, as described above.

Process 700 may include additional aspects, such as any single aspect or any combination of aspects described below and/or in connection with one or more other processes described elsewhere herein.

In a first aspect, process 700 includes transmitting a value of a threshold for transmitting the BSR.

In a second aspect, alone or in combination with the first aspect, activating the SCG includes activating the SCG by a DU of the network node without instruction by a central unit.

In a third aspect, alone or in combination with one or more of the first and second aspects, activating the SCG includes providing, by a DU of the network node, a request to activate the SCG to a CU of the network node and receiving an indication to activate the SCG.

In a fourth aspect, alone or in combination with one or more of the first through third aspects, activating the SCG includes activating the SCG based at least in part on a threshold for activating the SCG, where the threshold is based at least in part on one or more of locations of network nodes, an associated latency between the network nodes, or a load across the network nodes and interconnects between the network nodes.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
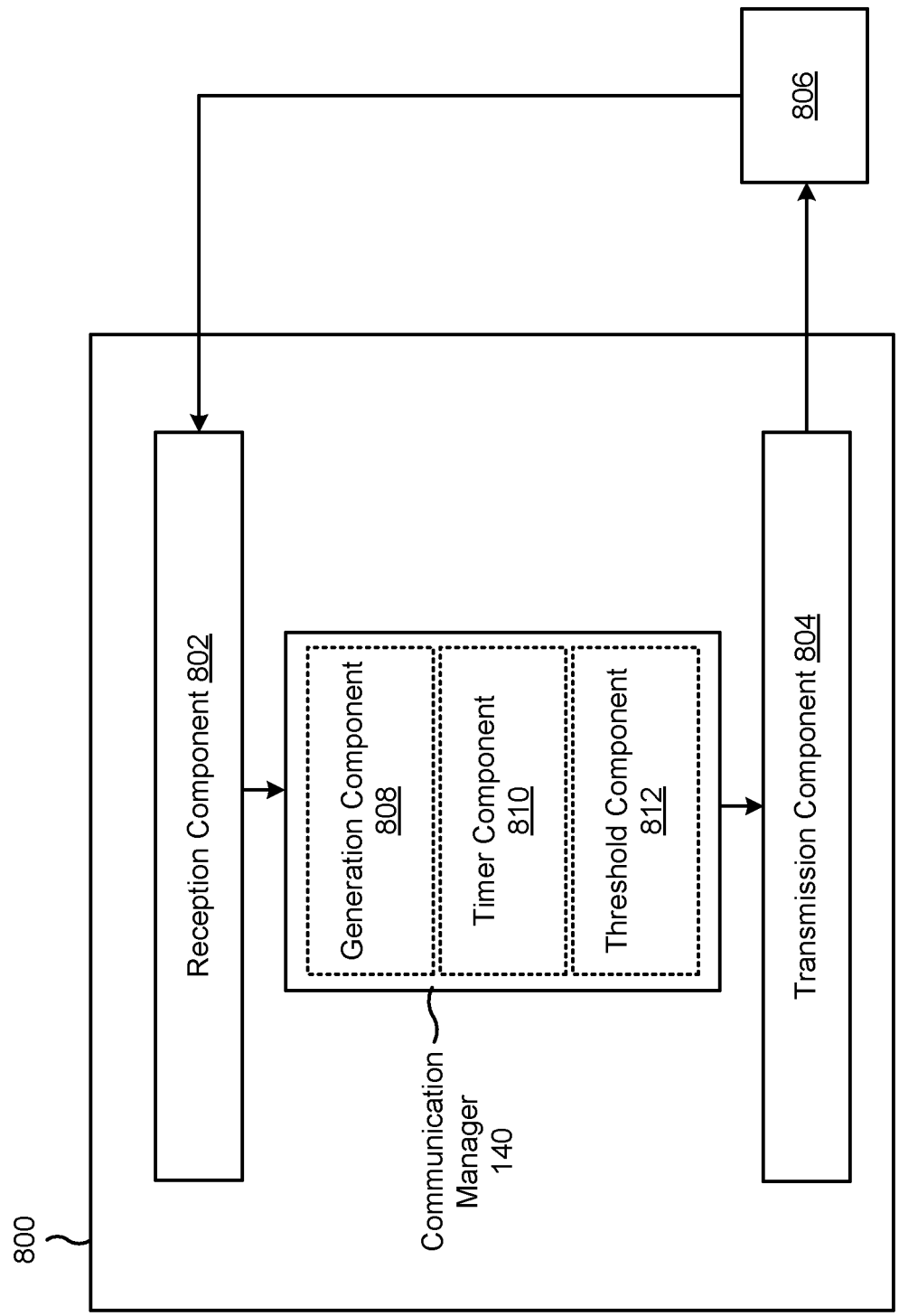
FIGS. 8-9 are diagrams of example apparatuses for wireless communication, in accordance with the present disclosure.

FIG. 8 is a diagram of an example apparatus 800 for wireless communication. The apparatus 800 may be a UE (e.g., a UE 120), or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a generation component 808, a timer component 810, and/or a threshold component 812, among other examples.

In some aspects, the apparatus 800 may be configured to perform one or more operations described herein in connection with FIGS. 1-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The generation component 808 may generate a BSR in response to a DRB for an SCG being a split DRB, the SCG being deactivated, and a buffer size satisfying a threshold for transmitting the BSR to activate the SCG. The transmission component 804 may transmit the BSR. The transmission component 804 and the reception component 802 may communicate on the SCG after activation of the SCG. The timer component 810 may restart a retransmission BSR timer in response to transmitting the BSR.

The threshold component 812 may set a value of the threshold to be different than a value of a data split threshold for an associated packet data convergence protocol bearer. The threshold component 812 may set the value of the threshold based at least in part on a received value for the threshold. The threshold component 812 may set a value of the threshold to match a value of a data split threshold for an associated packet data convergence protocol bearer, if the value of the threshold is not configured.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
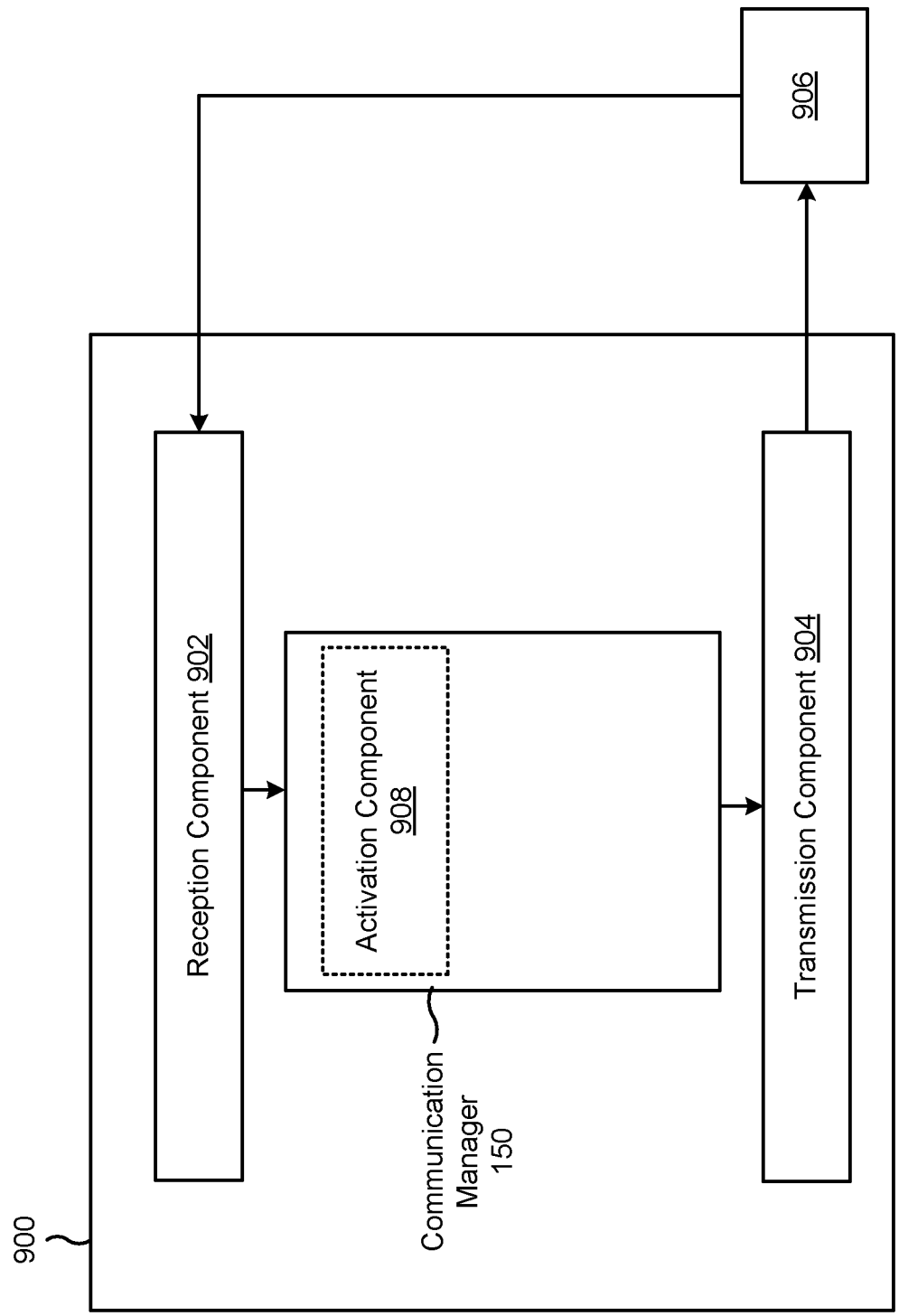

FIG. 9 is a diagram of an example apparatus 900 for wireless communication. The apparatus 900 may be a network node (e.g., base station 110), or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include an activation component 908, among other examples.

In some aspects, the apparatus 900 may be configured to perform one or more operations described herein in connection with FIGS. 1-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The reception component 902 may receive a BSR for a split DRB for an SCG that is deactivated. The activation component 908 may activate the SCG. The transmission component 904 and the reception component 902 may communicate on the SCG upon activation of the SCG. The transmission component 904 may transmit a value of a threshold for transmitting the BSR.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: generating a buffer status report (BSR) in response to a data radio bearer (DRB) for a secondary cell group (SCG) being a split DRB, the SCG being deactivated, and a buffer size satisfying a threshold for transmitting the BSR to activate the SCG; transmitting the BSR; and communicating on the SCG after activation of the SCG.

Aspect 2: The method of Aspect 1, wherein transmitting the BSR includes transmitting the BSR independently of whether a periodic BSR timer is running or a retransmission BSR timer is running.

Aspect 3: The method of Aspect 1 or 2, further comprising restarting a retransmission BSR timer in response to transmitting the BSR.

Aspect 4: The method of any of Aspects 1-3, further comprising setting a value of the threshold to be different than a value of a data split threshold for an associated packet data convergence protocol bearer.

Aspect 5: The method of any of Aspects 1-4, further comprising setting the threshold based at least in part on a received value for the threshold.

Aspect 6: The method of any of Aspects 1-3, further comprising setting a value of the threshold to match a value of a data split threshold for an associated packet data convergence protocol bearer, if the value of the threshold is not configured.

Aspect 7: A method of wireless communication performed by a network node, comprising: receiving a buffer status report (BSR) for a split data radio bearer (DRB) for a secondary cell group (SCG) that is deactivated; activating the SCG based at least in part on the BSR; and communicating on the SCG upon activation of the SCG.

Aspect 8: The method of Aspect 7, further comprising transmitting a value of a threshold for transmitting the BSR.

Aspect 9: The method of Aspect 7 or 8, wherein activating the SCG includes activating the SCG by a distributed unit of the network node without instruction by a central unit.

Aspect 10: The method of Aspect 7 or 8, wherein activating the SCG includes: providing, by a distributed unit (DU) of the network node, a request to activate the SCG to a central unit (CU) of the network node; and receiving, by the DU from the CU, an indication to activate the SCG.

Aspect 11: The method of any of Aspects 7-10, wherein activating the SCG includes activating the SCG based at least in part on a threshold for activating the SCG, wherein the threshold is based at least in part on one or more of locations of network nodes, an associated latency between the network nodes, or a load across the network nodes and interconnects between the network nodes.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   setting a first value of a threshold for transmitting a buffer status report (BSR) to activate a secondary cell group (SCG),
      wherein the first value of the threshold is different than a second value of a data split threshold for an associated packet data convergence protocol bearer if the first value of the threshold is received from a network node, or
      wherein the first value of the threshold matches a third value of the data split threshold for the associated packet data convergence protocol bearer if the first value of the threshold is not configured at the UE;
   generating the BSR in response to a data radio bearer (DRB) for the SCG being a split DRB, the SCG being deactivated, and a buffer size satisfying the threshold;
   transmitting the BSR; and
   communicating on the SCG after activation of the SCG.

2. The method of claim 1, wherein transmitting the BSR includes transmitting the BSR independently of whether a periodic BSR timer is running or a retransmission BSR timer is running.

3. The method of claim 1, further comprising restarting a retransmission BSR timer in response to transmitting the BSR.

4. The method of claim 1, wherein the first value of the threshold is different than the second value of the data split threshold for the associated packet data convergence protocol bearer if the first value of the threshold is received from the network node.

5. The method of claim 1, wherein the first value of the threshold matches the third value of the data split threshold for the associated packet data convergence protocol bearer if the first value of the threshold is not configured at the UE.

6. A method of wireless communication performed by a network node, comprising:
   transmitting, to a user equipment (UE), a first value for a threshold for transmitting a buffer status report (BSR) for a split data radio bearer (DRB) for a secondary cell group (SCG) that is deactivated, wherein the first value of the threshold is different than a second value of a data split threshold for an associated packet data convergence protocol bearer;
   receiving, from the UE, the BSR;
   activating the SCG based at least in part on the BSR; and
   communicating on the SCG upon activation of the SCG.

7. The method of claim 6, wherein activating the SCG includes activating the SCG by a distributed unit of the network node without instruction by a central unit.

8. The method of claim 6, wherein activating the SCG includes:
   providing, by a distributed unit (DU) of the network node, a request to activate the SCG to a central unit (CU) of the network node; and
   receiving, by the DU from the CU, an indication to activate the SCG.

9. The method of claim 6, wherein activating the SCG includes activating the SCG based at least in part on a threshold for activating the SCG, and wherein the threshold is based at least in part on one or more of locations of network nodes, an associated latency between the network nodes, or a load across the network nodes and interconnects between the network nodes.

10. The method of claim 6, wherein communicating on the SCG upon activation of the SCG comprises:
    communicating on the SCG upon activation of the SCG.

11. The method of claim 6, wherein the SCG is activated autonomously by a distributed unit of the network node without direction or instruction from a central unit of the network node.

12. A user equipment (UE) for wireless communication, comprising:
    one or more memories; and
    one or more processors, coupled to the one or more memories, individually or collectively configured to:
       set a first value of a threshold for transmitting a buffer status report (BSR) to activate a secondary cell group (SCG),
          wherein the first value of the threshold is different than a second value of a data split threshold for an associated packet data convergence protocol bearer if the first value of the threshold is received from a network node, or
          wherein the first value of the threshold matches a third value of the data split threshold for the associated packet data convergence protocol bearer if the first value of the threshold is not configured at the UE;
       generate the BSR in response to a data radio bearer (DRB) for the SCG being a split DRB, the SCG being deactivated, and a buffer size satisfying the threshold;
       transmit the BSR; and
       communicate on the SCG after activation of the SCG.

13. The UE of claim 12, wherein the one or more processors, to transmit the BSR, are individually or collectively configured to transmit the BSR independently of whether a periodic BSR timer is running or a retransmission BSR timer is running.

14. The UE of claim 12, wherein the one or more processors are individually or collectively configured to restart a retransmission BSR timer in response to transmitting the BSR.

15. The UE of claim 12, wherein the first value of the threshold is different than the second value of the data split threshold for the associated packet data convergence protocol bearer if the first value of the threshold is received from the network node.

16. The UE of claim 12, wherein the first value of the threshold matches the third value of the data split threshold for the associated packet data convergence protocol bearer if the first value of the threshold is not configured at the UE.

17. A network node for wireless communication, comprising:
    one or more memories; and
    one or more processors, coupled to the memories, individually or collectively configured to:
       transmit, to a user equipment (UE), a first value for a threshold for a buffer status report (BSR) for a split data radio bearer (DRB) for a secondary cell group (SCG) that is deactivated, wherein the first value of the threshold is different than a second value of a data split threshold for an associated packet data convergence protocol bearer;
       receive, from the UE, the BSR;
       activate the SCG based at least in part on the BSR; and
       communicate on the SCG upon activation of the SCG.

18. The network node of claim 17, wherein the one or more processors, to activate the SCG, are individually or collectively configured to activate the SCG by a distributed unit of the network node without instruction by a central unit.

19. The network node of claim 17, wherein the one or more processors, to activate the SCG, are individually or collectively configured to:
   cause a distributed unit (DU) of the network node to provide a request to activate the SCG to a central unit (CU) of the network node; and
   receive, at the DU of the network node, an indication to activate the SCG.

20. The network node of claim 17, wherein the one or more processors, to activate the SCG, are individually or collectively configured to activate the SCG based at least in part on a threshold for activating the SCG, wherein the threshold is based at least in part on one or more of: locations of network nodes including the network node, an associated latency between the network nodes, or a load across the network nodes and interconnects between the network nodes.

21. The network node of claim 17, wherein the one or more processors, to communicate on the SCG upon activation of the SCG, are individually or collectively configured to communicate on the SCG upon activation of the SCG.

22. The network node of claim 17, wherein the SCG is activated autonomously by a distributed unit of the network node without direction or instruction from a central unit of the network node.

\* \* \* \* \*